2,838,408

GLASS COMPOSITIONS

Guy E. Rindone, State College, Pa., assignor to Prismo Safety Corporation, Huntingdon, Pa., a corporation of Pennsylvania No Drawing. Application January 28, 1955
Serial No. 484,853

11 Claims. (Cl. 106—53)

The present invention relates to glass compositions having a high index of refraction and, more particularly, to glass compositions suitable for making small glass beads for use as retroreflective elements.

Painted highway markings and signs have been made strikingly visible to night time motorists by including small transparent glass beads in the paint layer. These tiny particles, in conjunction with the reflective pigment of the paint, act to reflect the incident light from the headlights back toward its source and thus make the painted area visible to the motorist.

To be effective for such use, the beads must have certain properties. They must have a fairly high refractive index, be transparent, resistant to weathering, and have great chemical stability. In the past, beads having a refractive index in the neighborhood of 1.55 or even lower, have been used. More recently, beads having a refractive index of at least 1.60 and in the range of 1.65–1.70 have been proposed.

It has often been observed in the past that glasses having high refractive indices are not chemically stable in relation to atmospheric attack.

It is an object of the present invention to provide novel compositions of glass which have high indices of refraction of at least 1.90.

It is a further object of the present invention to provide novel compositions of glass which have indices of refraction of at least 1.90 and still have good chemical stability.

It is a still further object of the present invention to provide novel glass compositions for making glass beads suitable for the reflectorizing of highway paints and signs, said beads having an index of refraction of at least 1.90.

These and other objects of the invention are accomplished by the following invention, wherein a glass having an index of refraction of at least 1.90, which is chemically stable to weathering, is produced which contains silicon dioxide, titanium dioxide, and at least two of the following ingredients: barium oxide, lead oxide, alkali metal oxide, such as potassium, sodium or lithium oxide, and arsenic oxide.

On slow cooling these glass compositions devitrify completely. However, rapid quenching prevents devitrification and produces transparent particles. Quenching the molten glass in water, as is the usual practice, is sufficient to produce transparent glass particles. Liquid droplets formed by passing crushed and graded particles of the glass through a flame or a radiant-heat stack, may be quenched to provide spherical transparent beads. The glass beads can be prepared by any conventional method similar to those, for example, as disclosed in Bleecker, Patent 1,175,224 or Potters, Patent 2,334,578.

*Example 1*

One glass which has given exceptionally good results in the form of small glass beads, when used as retroreflective lenses, has the following composition:

|  | Mol Percent | Wt. Percent |
| --- | --- | --- |
| $SiO_2$ | 33.0 | 19.2 |
| $TiO_2$ | 34.0 | 26.4 |
| $BaO$ | 25.1 | 37.4 |
| $PbO$ | 7.5 | 16.2 |
| $As_2O_3$ | 0.4 | 0.8 |

The index of refraction of this composition was 1.91.

*Example 2*

Another composition which has given good results with an index of refraction of 2.00 is as follows:

|  | Mol Percent | Wt. Percent |
| --- | --- | --- |
| $SiO_2$ | 26.7 | 14.9 |
| $TiO_2$ | 40.0 | 29.6 |
| $BaO$ | 20.6 | 29.3 |
| $PbO$ | 12.2 | 25.3 |
| $As_2O_3$ | 0.5 | 0.9 |

Other examples of suitable compositions are as follows:

*Example 3*

|  | Mol Percent | Wt. Percent |
| --- | --- | --- |
| $SiO_2$ | 22.0 | 11.0 |
| $TiO_2$ | 37.6 | 25.1 |
| $BaO$ | 19.3 | 24.7 |
| $PbO$ | 20.6 | 38.4 |
| $As_2O_3$ | 0.5 | 0.8 |

Index of refraction—over 2.00.

*Example 4*

|  | Mol Percent | Wt. Percent |
| --- | --- | --- |
| $SiO_2$ | 30.7 | 19.9 |
| $TiO_2$ | 45.7 | 38.3 |
| $BaO$ | 3.5 | 5.8 |
| $PbO$ | 10.6 | 26.4 |
| $K_2O$ | 9.5 | 9.6 |

Index of refraction—1.93.

*Example 5*

|  | Mol Percent | Wt. Percent |
| --- | --- | --- |
| $SiO_2$ | 30.7 | 18.5 |
| $TiO_2$ | 45.7 | 36.5 |
| $PbO$ | 17.6 | 39.3 |
| $K_2O$ | 6.0 | 5.7 |

Index of refraction—1.97.

*Example 6*

|  | Mol Percent | Wt. Percent |
| --- | --- | --- |
| $SiO_2$ | 29.4 | 18.8 |
| $TiO_2$ | 44.0 | 37.4 |
| $BaO$ | 26.0 | 42.5 |
| $As_2O_3$ | 0.6 | 1.3 |

Index of refraction—1.91.

Example 7

|   | Mol Percent | Wt. Percent |
|---|---|---|
| SiO₂ | 27.8 | 14.2 |
| TiO₂ | 31.8 | 21.6 |
| BaO | 21.3 | 27.9 |
| PbO | 19.1 | 36.3 |

Index of refraction—2.00.

As is common in glass technology, the above examples are given in terms of oxides of the elements. These components may be added to the glass batch in several different forms, however. The barium may be added as barium carbonate or barium nitrate. The lead can be added as the nitrate or silicate. The potassium can be added as potassium carbonate. It should be noted that sodium or lithium oxide could be used in place of the potassium oxide.

While the proportions of the ingredients in the examples can be varied somewhat, the range within which the desired properties are to be obtained is not great, as will be apparent from the following:

|   | Mol percent |
|---|---|
| $SiO_2$ | 20–33 |
| $TiO_2$ | 30–50 |
| BaO | Up to 32 |
| PbO | Up to 26 |
| $K_2O$ | Up to 9.5 |
| $As_2O_3$ | Up to 1.0 | wherein the composition has at least four ingredients and the total percent of BaO, PbO, K₂O and As₂O₃ is over 20. As shown in the previous examples, compositions, each having an index of refraction of at least 1.90, have been obtained wherein the total percent of BaO, PbO, K₂O and As₂O₃ is in the range 23.6–40.4.

When used on reflectorized signs, glass beads made up from the above compositions give great distance retroreflection which tends to diminish in intensity as the sign is approached. For example, at 1400 feet, the sign is easily seen and at reading distance, 300–400 feet, the message thereon is easily read without the blinding glare so common in the use of high light return material. Utilizing this material on a colored background, a colorless reflection is obtained at great distances until at the reading distance, at which point the true color of the background will be seen.

The use of arsenic oxide in the composition tends to decrease the color of the glass and to raise the index slightly. By using barium nitrate for introducing the barium oxide, or even some lead nitrate for introducing the lead oxide, the colors of the glasses are tremendously improved.

As previously indicated, small transparent glass beads or spheres may be produced from the compositions described above by suspending small particles of the glass in air at a moderately high temperature for a brief time and then quickly cooling. Whereas much larger masses having these compositions would either crack or devitrify, small spheres can be successfully prepared by such methods in the form of clear, transparent, substantially colorless, weather-resistant and traffic-resistant beads.

It will be obvious to those skilled in the art that various changes may be made without departing from the spirit of the invention and therefore the invention is not limited to what is described in the specification, but only as indicated in the appended claims.

What is claimed is:

1. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| BaO | Up to 32 |
| PbO | Up to 26 |
| $K_2O$ | Up to 9.5 |
| $As_2O_3$ | Up to 1.0 | wherein the composition has at least four ingredients and the total percent of BaO, PbO, K₂O and As₂O₃ is 23.6–40.4.

2. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| BaO | 3.5–32 |
| PbO | 7.5–26 |
| $K_2O$ | Up to 9.5 |
| $As_2O_3$ | Up to 1.0 | wherein the total percent of BaO, PbO, K₂O and As₂O₃ is 23.6–40.4.

3. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| BaO | 26–32 |
| $K_2O$ | Up to 9.5 |
| $As_2O_3$ | Up to 1.0 | wherein the composition has at least four ingredients.

4. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| PbO | 17.6–26 |
| $K_2O$ | Up to 9.5 |
| $As_2O_3$ | Up to 1.0 | wherein the composition has at least four ingredients.

5. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| BaO | 19.3–32 |
| PbO | 7.5–26 |
| $As_2O_3$ | Up to 1 |

6. Transparent, weather-resistant small glass beads having a refractive index of at least 1.90 and a composition consisting essentially of the following mol percent:

| $SiO_2$ | 20–33 |
|---|---|
| $TiO_2$ | 30–50 |
| BaO | 3.5–32 |
| PbO | 10.6–26 |
| $K_2O$ | Up to 9.5 |

7. Transparent, weather-resistant small glass beads having a refractive index of 1.91 and a composition of the following mol percent:

| $SiO_2$ | 33.0 |
|---|---|
| $TiO_2$ | 34.0 |
| BaO | 25.1 |
| PbO | 7.5 |
| $As_2O_3$ | 0.4 |

8. Transparent, weather-resistant small glass beads having a refractive index of at least 1.90 and a composition consisting essentially of the following mol percent:

| | |
|---|---|
| $SiO_2$ | 22–33 |
| $TiO_2$ | 34–40 |
| BaO | 19.3–25.1 |
| PbO | 7.5–20.6 |
| $As_2O_3$ | 0.4–1.0 |

9. Transparent, weather-resistant small glass beads having a refractive index of 2.00 and a composition of the following mol percent:

| | |
|---|---|
| $SiO_2$ | 26.7 |
| $TiO_2$ | 40.0 |
| BaO | 20.6 |
| PbO | 12.2 |
| $As_2O_3$ | 0.5 |

10. Transparent, weather-resistant small glass beads having a refractive index of 1.91 and a composition of the following mol percent:

| | |
|---|---|
| $SiO_2$ | 29.4 |
| $TiO_2$ | 44.0 |
| BaO | 26.0 |
| $As_2O_3$ | 0.6 |

11. Transparent, weather-resistant small glass beads having a refractive index of 2.00 and a composition of the following mol percent:

| | |
|---|---|
| $SiO_2$ | 27.8 |
| $TiO_2$ | 31.8 |
| BaO | 21.3 |
| PbO | 19.1 |

References Cited in the file of this patent

UNITED STATES PATENTS

| | | |
|---|---|---|
| 2,220,765 | Hirose et al. | Nov. 5, 1940 |
| 2,220,775 | Navias | Nov. 6, 1940 |
| 2,726,161 | Beck et al. | Dec. 6, 1955 |

FOREIGN PATENTS

| | | |
|---|---|---|
| 556,895 | Germany | 1932 |
| 703,671 | France | 1931 |
| 719,067 | France | 1931 |